May 17, 1966    H. SPRINGER    3,251,086
POWER HANDLE ASSEMBLY
Filed July 21, 1964    3 Sheets-Sheet 1
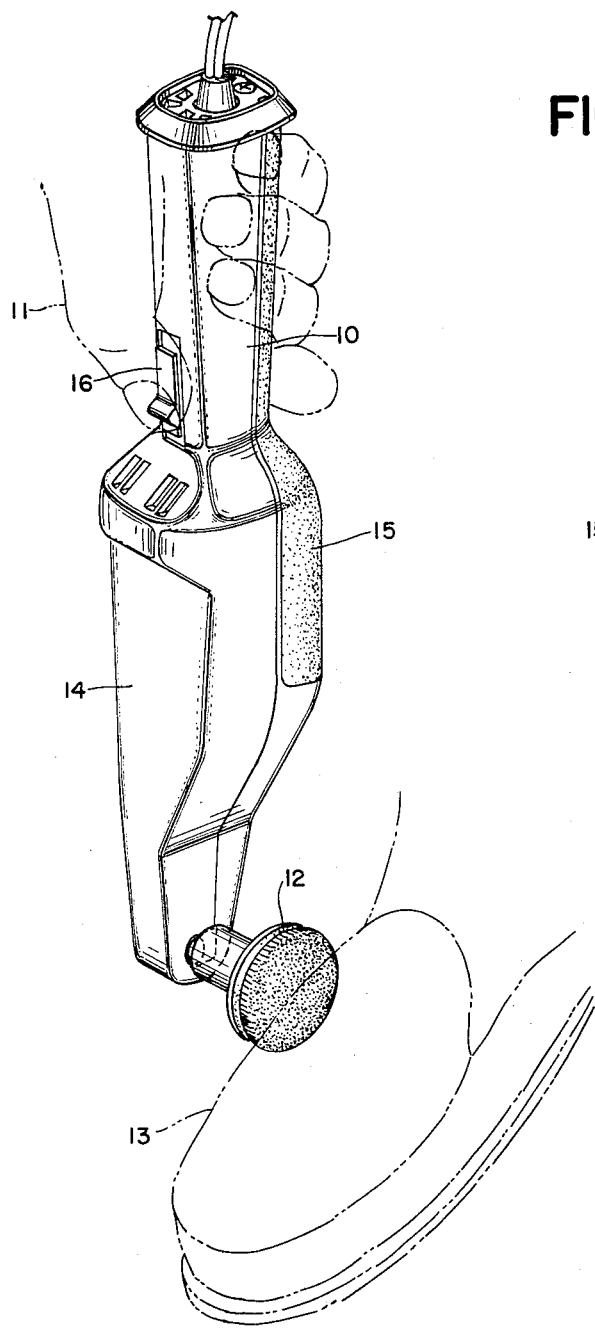
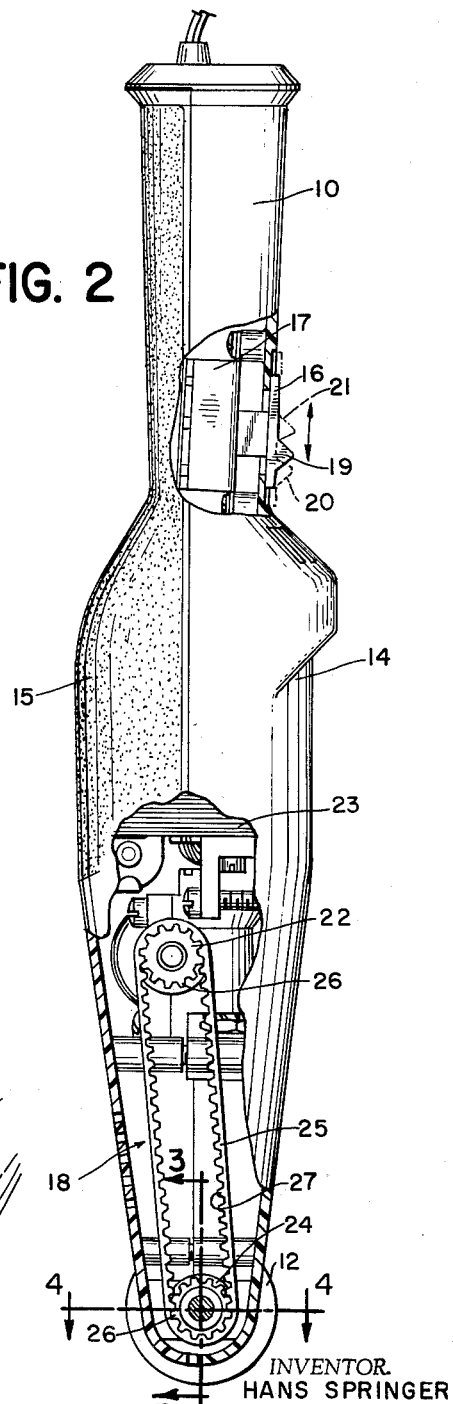
INVENTOR.
HANS SPRINGER
BY Leonard Platt
ATTORNEY

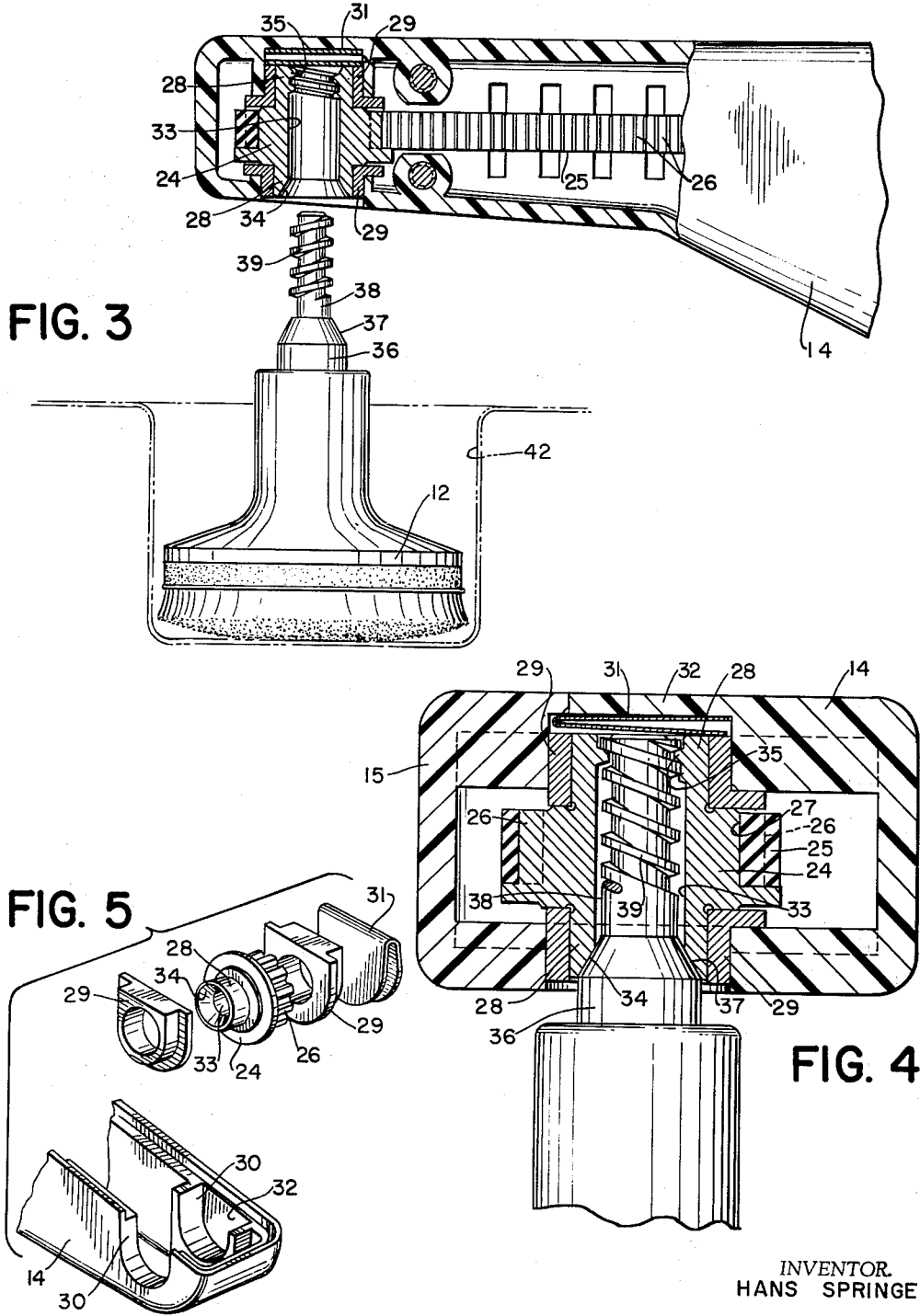

May 17, 1966  H. SPRINGER  3,251,086
POWER HANDLE ASSEMBLY
Filed July 21, 1964  3 Sheets-Sheet 3

INVENTOR.
HANS SPRINGER
BY
ATTORNEY

United States Patent Office 3,251,086
Patented May 17, 1966

3,251,086
POWER HANDLE ASSEMBLY
Hans Springer, Ashland, Mass., assignor to General Electric Company, a corporation of New York
Filed July 21, 1964, Ser. No. 384,199
11 Claims. (Cl. 15—28)

This invention relates to a power handle assembly including a power handle, implements for use with the handle, and implement storing means. More specifically, this invention relates to a power handle provided with a quick coupling arrangement, which imparts rotational motion to an implement, and which can be used to remove and return implements to a storing means.

The use of several implements with a power handle necessitates the removal from, and the securing to, the power handle of the several different implements. In the application of prior art power handle assemblies for use as shoe polishers it has been necessary for the operator to hold the implements, such as brushes or applicator pads, when attaching them to or removing them from the power handle. Since the implements are usually covered with polish, the messiness of this operation is objectionable.

It is an object of this invention to provide an improved quick coupling arrangement for securing an implement to a power handle.

It is another object of this invention to provide a power handle assembly including a power handle and an implement storing means wherein an implement can be removed from and replaced in the storing means without necessitating handling of the implement by an operator.

These objects are accomplished in accordance with this invention, in one form thereof, by providing a power handle comprising an electric motor coupled to drive a rotating member to which implements are attached. The implements are provided with a mounting means including a threaded shaft which is secured in a threaded bore formed in the rotating member. A storing means is provided which frictionally engages the implements to resist their rotation when they are attached to or removed from the power handle. The rotating member is turned by a reversible electric motor in a first direction to attach and drive the implement and in the opposite direction to detach the implement.

Other objects and further details of that which is believed to be novel in the invention will be clear from the following description and claims taken with the accompanying drawings wherein:

FIG. 1 is a perspective view of a shoe polisher power handle constructed in accordance with this invention with an applicator also constructed in accordance with this invention attached and in use.

FIG. 2 is a side view of the power handle with some portions broken away for the sake of clarity.

FIG. 3 is a sectional view of a portion of the power handle taken substantially along the line 3—3 of FIG. 2 with an implement shown in position for attachment to the power handle.

FIG. 4 is a sectional view of the power handle assembly taken along the line 4—4 of FIG. 2, and showing an implement shaft positioned in driving engagement with the power handle.

FIG. 5 is an exploded view of the implement engaging and driving portion of the power handle.

Figure 6:
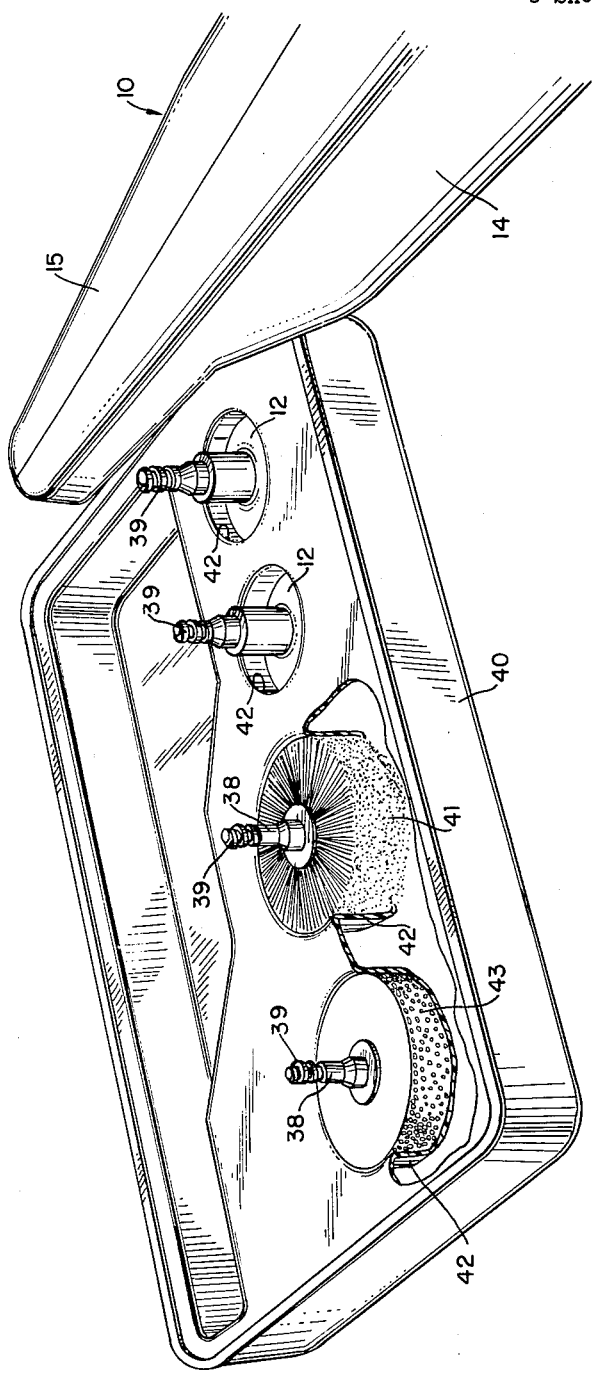
FIG. 6 is a perspective view of a shoe polisher assembly including a power handle, implements and implement-storing means.

A shoe polisher power handle 10 grasped in an operator's hand 11 is shown in FIG. 1. An implement, specifically applicator pad 12 attached to the power handle, is shown in use on a shoe 13. The power handle casing comprises an upper casing portion 14 and a lower casing portion 15 as is best seen in FIGS. 1 and 2.

Parts of the casing are broken away in FIG. 2 to show the mounting of the switch knob 16, switch structure 17, and the implement driving means 18. The slide switch 17 has one OFF and two ON positions. The switch knob 16 is shown in the OFF position 19 by the solid lines, while the lower dotted position is a stable ON position 20 and the upper dotted position is a momentary ON position 21.

The implement driving means comprises a reversible drive pulley 22, which is connected by a gear train to an electric motor 23, a rotating member or driven pulley 24, and a drive belt 25 which engages the drive pulley and the driven pulley. The drive pulley and the driven pulley are provided with teeth 26 which engage notches 27 in the drive belt 25 to provide a nonslip drive.

Details of the arrangement for coupling an applicator pad 12 to the power handle are shown in FIG. 3. The driven pulley 24, which is integrally formed with a pair of oppositely extending shaft extensions 28, and a pair of identical shaft bushings 29, which support the extensions 28, are best seen in FIG. 5. The upper casing portion 14 is provided with a pair of notches 30 which receive the shaft bushings 29. A spring 31, formed by folding a piece of resilient sheet metal, is placed between one of the shaft bushings 29 and side wall 32 of the upper casing portion to prevent end play of the driven pulley 24.

The driven pulley is provided with a bore 33, one end of which is provided with a conical flared portion 34, and the other end of which is provided with threads 35, as is shown in FIGS. 3 and 4. The applicator pad 12 designed for use with the power handle is provided with a shaft 36 having a conically tapered portion 37, and a shaft portion of reduced diameter 38 provided with a coarse double lead thread 39. The implement shaft is inserted in the bore 33, with the shaft thread 39 engaging the threads 35 in the driven pulley 24, and with the conically tapered portion 37 of the shaft engaging the conically flared portion 34 of the driven pulley. The relationship of the shaft and the driven pulley shown in FIG. 4 is that which is assumed when the implement is in use with a power handle.

FIG. 6 shows an implement-storing means 40 and a power handle 10 positioned for engagement with a brush 41. The implement-storing means includes a plurality of recesses 42 in which the implements such as applicator pads 12, brush 41, or synthetic resin foam buffing pad 43 are inserted. The synthetic resin foam buffing pad 43 is in a preferred embodiment made of a polyurethane foam. The shafts 38 of the implements extend out of the recesses. The brush bristles, applicator pad, and foam pad frictionally engage the walls of the recesses to resist rotation of the implements within the recesses when they are attached to or detached from the power handle.

To attach an implement to the power handle, the switch knob 16 is pushed by the operator's thumb to the stable ON position 20 as shown in FIG. 2. With the switch knob in this position the motor is energized to rotate the driven pulley 24 in a direction which causes the shaft thread 39 to be threaded into the bore threads 35; this causes the conically tapered portions 37 of the shaft to engage the conically flared portion 34 of the driven pulley to provide a connection between the shaft and the driven pulley which is longitudinally and transversely rigid. With the switch maintained in position 20 the implement is rotated for use in buffing a shoe 13. To return an implement such as a brush 41 or an applicator pad 12 to the storing means the switch is first moved to OFF position 19. The implement is then inserted in one of the recesses 42 in the storage means as shown in FIG. 6. The switch is subsequently moved to momentary ON position 21 as shown in FIG. 2. With the switch in position 21 the motor is rotated in the opposite direction to unscrew and detach the implement from the power handle.

It can readily be seen that with a power handle and with implements provided with the attachment means of this invention it is unnecessary for the operator to handle the implements. The implements are easily removed from and returned to the storing means by the power handle itself and it is unnecessary for the operator to touch the implements. Since the implements are usually covered with shoe polish which would stain the operator's hand this is a significant advantage.

While the preferred embodiment of the invention has been shown, various other modifications and embodiments of the invention will be apparent to those skilled in the art, and it is intended to cover by the appended claims all said modifications falling within the scope thereof.

What is claimed as new and desired to be secured by Letters Patent of the United States is:

1. A shoe polisher power handle assembly comprising:
   (a) a shoe polisher power handle including a rotating member having first threads thereon;
   (b) a shoe polishing implement to be driven by said rotating member having second threads thereon;
   (c) means for causing said rotating member to be turned in a first direction to engage said first and second threads for attaching said shoe polishing implement to said rotating member and for driving said implement;
   (d) means for causing said rotating member to be turned in the opposite direction to disengage said first and second threads for detaching said shoe polishing implement from said rotating member; and means on said shoe polishing implement for frictionally restricting rotation of said implement while it is being attached to or detached from said rotating member.

2. A shoe polisher power handle assembly comprising:
   (a) a shoe polisher power handle including a rotating member provided with a bore having threads therein;
   (b) a shoe polishing implement to be driven by said rotating member having a shaft with threads thereon;
   (c) means for causing said rotating member to be turned in a first direction to screw said shaft into said bore for attaching said shoe polishing implement to said rotating member and for driving said implement;
   (d) means for causing said rotating member to be turned in the opposite direction to disengage said first and second threads for detaching said shoe polishing implement from said rotating member; and means on said shoe polishing implement for frictionally restricting rotation of said implement while it is being attached to or detached from said rotating member.

3. A shoe polisher power handle assembly comprising:
   (a) a shoe polisher power handle including a rotating member in a power handle provided with a bore, one end of said bore being threaded and the opposite end of said bore being conically flared;
   (b) a shoe polishing implement to be driven by said rotating member having a shaft, said shaft including a conically tapered portion and an end portion provided with threads, said threads being adapted to engage said threads in said rotating member;
   (c) means for causing said rotating member to be turned in a first direction to screw said shaft into said bore until said tapered portion of said shaft engages said flared portion of said rotating member, thereby attaching said shoe polishing implement in a driving relationship to said rotating member;
   (d) means for causing said rotating member to be turned in the opposite direction to unscrew said shaft from said bore for detaching said shoe polishing implement from said rotating member; and means on said shoe polishing implement for frictionally restricting rotation of said implement while it is being attached to or detached from said rotating member.

4. A shoe polisher power handle assembly comprising:
   (a) a shoe polisher power handle including a motor;
   (b) a rotating member in said power handle driven by said motor and provided with a bore having threads therein;
   (c) a shoe polishing implement to be driven by said rotating member having a shaft with threads thereon;
   (d) means for causing said motor to turn said rotating member in a first direction to screw said shaft into said bore for attaching said implement to said rotating member and for driving said shoe polishing implement;
   (e) means for causing said motor to turn said rotating member in the opposite direction to unscrew said shaft from said bore for detaching said shoe polishing implement from said rotating member; and means frictionally holding said shoe polishing implement to restrict rotation of said implement while it is being attached to or detached from said rotating member.

5. A shoe polisher power handle assembly comprising:
   (a) a shoe polisher power handle including a reversible electric motor;
   (b) a rotating member in said power handle driven by said motor and provided with a bore having threads therein;
   (c) a shoe polishing implement to be driven by said rotating member having a shaft with threads thereon; and
   (d) a switch for controlling the energization of said electric motor;
   (e) said switch having a stable position for energizing said motor to turn said rotating member in a first direction for screwing said shaft into said bore to attach said implement to said rotating member and to drive said shoe polishing implement;
   (f) said switch further having a momentary switch position for energizing said motor to turn said rotating member in the opposite direction for unscrewing said shaft from said bore to detach said shoe polishing implement from said rotating member; and means frictionally holding said shoe polishing implement to restrict the rotation of said implement while it is being attached to or detached from said rotating member.

6. A power handle assembly comprising:
   (a) a power handle including a motor;
   (b) a rotating member in said power handle driven by said motor and provided with a bore having threads therein;
   (c) an implement to be driven by said rotating member having a shaft with threads thereon;
   (d) a storing means for said implement, said storing means frictionally engaging said implement to resist rotation of said implement while it is being attached to or detached from said rotating member;
   (e) means for causing said motor to turn said rotating member in a first direction for screwing said shaft into said bore to attach said implement to said rotating member and to drive said implement; and
   (f) means for causing said motor to turn said rotating member in the opposite direction for unscrewing said shaft from said bore to detach said implement from said rotating member.

7. A power handle assembly comprising:
   (a) a power handle including a motor;
   (b) a rotating member in said power handle driven by said motor and provided with a bore having threads therein;
   (c) an implement to be driven by said rotating member having a shaft with threads thereon;

(d) a storing means having a recess therein for said implement, the walls of said recess frictionally engaging said implement to resist rotation of said implement while it is being attached to or detached from said rotating member;

(e) means for causing said motor to turn said rotating member in a first direction for screwing said shaft into said bore to attach said implement to said rotating member and to drive said implement; and (f) means for causing said motor to turn said rotating member in the opposite direction for unscrewing said shaft from said bore to detach said implement from said rotating member.

8. A shoe polisher power handle assembly comprising:
(a) a power handle including a reversible electric motor;
(b) a rotating member in said power handle driven by said motor and provided with a bore, one end of said bore being threaded and the opposite end being conically flared;
(c) an implement to be driven by said rotating member having a shaft, said shaft including a conically tapered portion and an end portion provided with threads, said threads being adapted to engage said threads in said rotating member;
(d) a storing means having a recess therein for said implement, the walls of said recess frictionally engaging said implement to resist rotation of said implement while it is being attached to or detached from said rotating member in said power handle;
(e) a switch for controlling the energization of said electric motor;
(f) said switch having ON OFF position and a stable ON position for energizing said motor to turn said rotating member in a first direction for screwing said shaft into said bore to attach said implement to said rotating member and to drive said implement;

(g) said switch further having a momentary ON position for energizing said motor to turn said rotating member in the opposite direction for unscrewing said shaft from said bore to detach said implement from said rotating member.

9. A shoe polisher power handle assembly defined in claim 8 wherein said implement is a brush and said storing means frictionally engages the bristles of said brush.

10. A shoe polisher power handle assembly defined in claim 8 wherein said implement is an applicator pad and said storing means frictionally engages said applicator pad.

11. A shoe polisher power handle assembly defined in claim 8 wherein said implement is a synthetic resin foam buffing pad and said storing means frictionally engages said foam pad.

References Cited by the Examiner

UNITED STATES PATENTS

| | | | |
|---|---|---|---|
| 1,265,536 | 5/1918 | Sharps | 15—28 |
| 1,593,763 | 7/1926 | Henderson | 15—23 |
| 2,674,896 | 4/1954 | Arones | 74—231 |
| 2,840,837 | 7/1958 | Gustems | 15—23 |
| 2,915,912 | 12/1959 | Hussar | 15—28 X |
| 2,934,775 | 5/1960 | Bergstrom | 15—28 X |
| 3,027,585 | 4/1962 | Freedman et al. | 15—28 X |
| 3,028,770 | 4/1962 | Pittwood. | |
| 3,106,732 | 10/1963 | Dayton et al. | 15—28 |
| 3,162,876 | 12/1964 | Aronson et al. | 15—28 |

FOREIGN PATENTS 572,719  3/1933  Germany.

CHARLES A. WILLMUTH, *Primary Examiner.*

EDWARD L. ROBERTS, *Assistant Examiner.*